US005430723A

United States Patent [19]
Nakaide et al.

[11] Patent Number: 5,430,723
[45] Date of Patent: Jul. 4, 1995

[54] TIME-SLOT SWITCHING SYSTEM IDENTIFYING AND STORING ONLY TIME-SLOT SIGNALS TO BE OUTPUT IN A TIME DIVISION MULTIPLEX CONTROL SYSTEM

[75] Inventors: Hiroshi Nakaide; Katsuhiko Nakamoto; Kensaburo Namba; Shinji Hiyama; Satoshi Takeda, all of Kawasaki, Japan

[73] Assignee: NEC Corporation, Tokyo, Japan

[21] Appl. No.: 61,218

[22] Filed: May 13, 1993

[30] Foreign Application Priority Data

May 13, 1992 [JP] Japan .................. 4-119415

[51] Int. Cl.⁶ ........................... H04Q 11/04
[52] U.S. Cl. ........................... 370/66; 370/68
[58] Field of Search ............. 370/66, 68, 62, 14, 370/15, 112, 61, 64

[56] References Cited

U.S. PATENT DOCUMENTS

| | | | |
|---|---|---|---|
| 4,759,010 | 7/1988 | Murata et al. | 370/66 |
| 4,759,012 | 7/1988 | Suzuki | 370/66 |
| 4,972,407 | 11/1990 | Kawai | 370/68 |
| 5,271,002 | 12/1993 | Barri et al. | 370/58.1 |

FOREIGN PATENT DOCUMENTS 392027 4/1991 Japan .

*Primary Examiner*—Douglas W. Olms
*Assistant Examiner*—Shick Hom

[57] ABSTRACT

A time switch control system having a cross-connect function is used for digital time-division. Multiplex communications permit desired channel settings and reduce power consumption. Identifying circuits identify which time-slot signals are to be retained by an input signal retaining memory, and output identification information to the retention memory, and to a retention memory controller. The retention memory controller stores therein the identification information from the identifying circuits, then reads out the identification information, and controls the input signal retaining memory in accordance with the contents of the identification information. Only the specified time-slot signals are stored and retained by the input signal retaining memory, thereby reducing power requirements. Exchange/output circuits exchange the time-slot signals stored in the input signal retaining memory in accordance with channel setting information, and output the exchanged signals.

6 Claims, 12 Drawing Sheets

|  | a1 | a2 | a3 | a4 |
|---|---|---|---|---|
| In#1 | 11 | 12 | 13 | 14 |
| In#2 | 21 | 22 | 23 | 24 |
| In#n | n1 | n2 | n3 | n4 |

FIG. 4A

|  | b1 | b2 | b3 | b4 |
|---|---|---|---|---|
| Out#1 | #1,a3 | — | #2,a3 | #n,a1 |
| Out#2 | — | — | #1,a4 | #n,a2 |
| Out#m | #2,a2 | #1,a1 | — | — |

FIG. 4B

|  | a1 | a2 | a3 | a4 |
|---|---|---|---|---|
| In#1 | 0 | 1 | 0 | 0 |
| In#2 | 1 | 0 | 0 | 1 |
| In#n | 0 | 0 | 1 | 1 |

FIG. 4C

|  | a1 | a2 | a3 | a4 |
|---|---|---|---|---|
| In#1 | 11 | – | 13 | 14 |
| In#2 | – | 22 | 23 | – |
| In#n | n1 | n2 | – | – |

FIG. 5A

|  | b1 | b2 | b3 | b4 |
|---|---|---|---|---|
| Out#1 | 13 | – | 23 | n1 |
| Out#2 | – | – | 14 | n2 |
| Out#m | 22 | 11 | – | – |

FIG. 5B

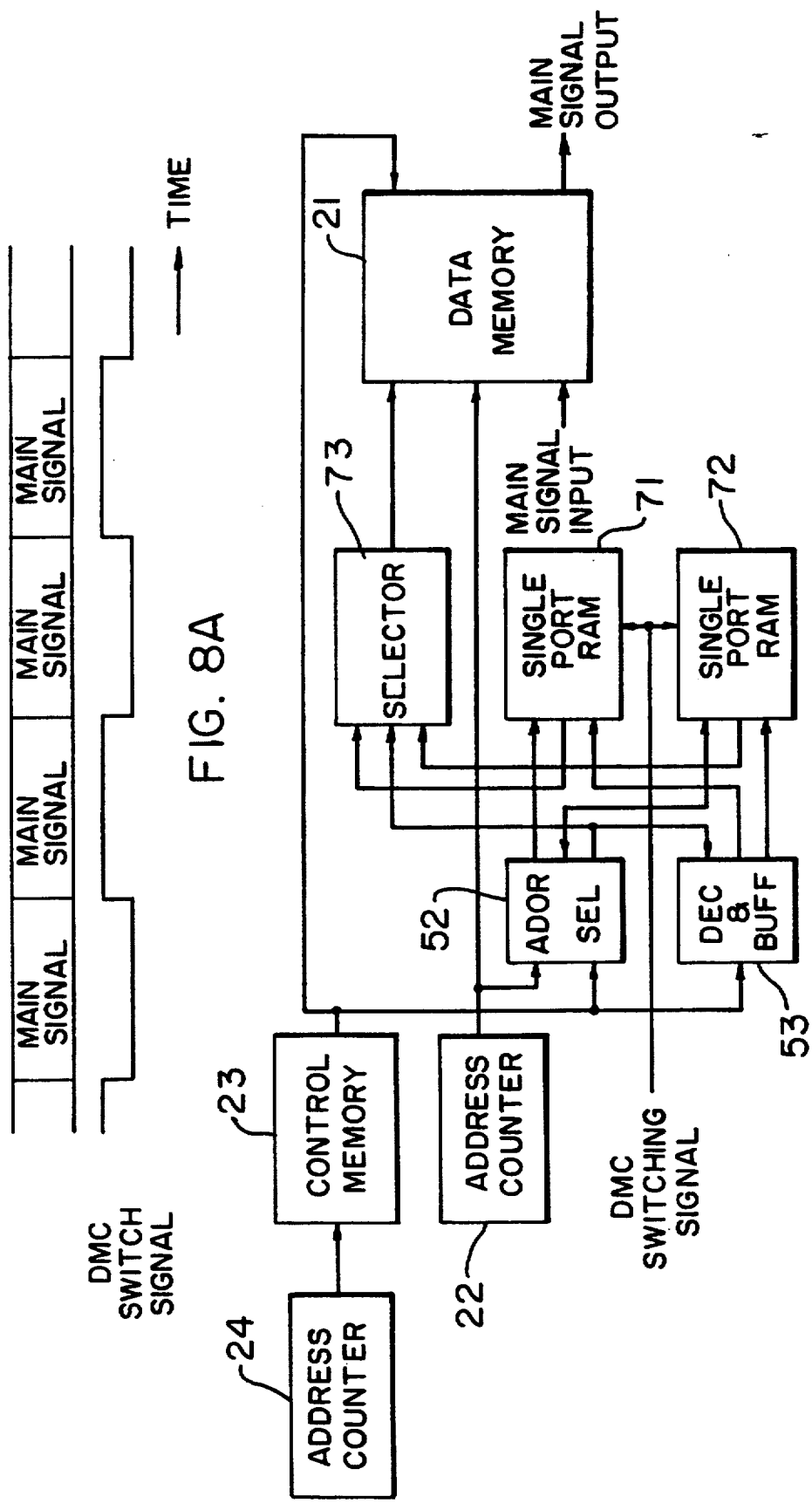

TIME-SLOT SWITCHING SYSTEM IDENTIFYING AND STORING ONLY TIME-SLOT SIGNALS TO BE OUTPUT IN A TIME DIVISION MULTIPLEX CONTROL SYSTEM

BACKGROUND OF THE INVENTION (1) Field of the Invention

The present invention relates to a time switch control system, and more particularly, to a time switch control system used for digital time-division multiplex communications and having a cross-connect function for exchanging time-slot signals input thereto from a plurality of channels within the channels in accordance with channel setting information.

(2) Description of the Related Art

Recent transmission systems and the like adapted for digital time-division multiplex communications have a cross-connect function to achieve effective use of channels. The cross-connect function permits a plurality of time-slot signals input from a plurality of channels to be exchanged within the channels for output, whereby multiposition switching, as well as flexible use of channels such as the setting of a number of channels according to traffic etc., is available, thus permitting effective use of the channels. To achieve the cross-connection function, a time switch (TSW) must be provided as an indispensable element.

Referring to FIG. 1, the arrangement and operation of a conventional time switch (TSW) will be explained. In FIG. 1, (A) shows the arrangement of a conventional time switch, (B) shows input signals to the time switch, and (C) shows output signals from the time switch.

A data memory (DM) 91 is supplied with input signals In#1 to In#n from n channels. As shown in FIG. 1(B), the input signals In#1 to In#n are each composed of, e.g., four time-slot signals per cycle, and the data memory (DM) 91 sequentially stores all of the four time-slot signals from the individual channels in accordance with the addressing of a DM write address counter (DMAD CNTR) 92.

A control memory (CM) 93 stores channel setting information. The channel setting information is given as a command from the operating system of a work station or the like, and comprises address information indicating how the input time-slot signals should be exchanged. The control memory (CM) 93 supplies the channel setting information to the data memory (DM) 91 in accordance with the addressing from a CM read address counter (CMAD CNTR) 94, and the data memory (DM) 91 reads out the input time-slot signals stored therein and supplies the same to m channels as output signals Out#1 to Out#m in accordance with the channel setting information supplied thereto. The output signals Out#1 to Out#m are shown in FIG. 1(C). Reading and outputting the input time-slot signals in accordance with the channel setting information means that the time-slot signals are eventually exchanged. In (B) and (C) of FIG. 1, numbers in the squares represent time-slot numbers, and symbol "—" in the squares indicates that there is no time-slot signal to be output, i.e., an unconnected state of the channel concerned, because of the absence of a channel setting.

In the conventional time switch described above, all of the input time-slot signals are sequentially stored in the data memory (DM) 91. Thus, the stored time-slot signals may include those which are not actually output, depending on the channel setting, and this means that some area of the data memory (DM) 91 is occupied by unnecessary time-slot signals.

This will be explained with reference to FIG. 1. Comparison between the output signals shown in (C) and the input signals shown in (B) reveals that the five time-slot signals 12, 21, 24, n3 and n4 are not output, and thus are useless signals which need not be stored in the data memory (DM) 91.

In the case where an SRAM is used for the data memory (DM) 91, for example, power consumed in an operation mode in which data is retained is on the order of 10 to 100 mW, whereas power consumed in the standby mode, in which data is not retained, is on the order of $\mu$W. Thus, if useless time-slot signals are excluded from the data memory (DM) 91, the power consumption can be greatly cut down.

Meanwhile, a time-slot exchange circuit requires a large-capacity memory because all of the input time-slot signals are temporarily stored before being exchanged. In this regard, Unexamined Japanese Patent Publication (KOKAI) No. 3-92027 discloses a circuit in which, among input time-slot signals, only those which are to be exchanged are stored to thereby reduce the required memory capacity. However, this circuit is not designed to achieve the cross-connect function by which time-slot signals are exchanged among a plurality of channels; it is designed to merely transpose time-slot signals within the same channel, to be more specific, it is designed to temporarily store a predetermined time-slot signal selected among input time-slot signals and then insert the stored time-slot signal into the input time-slot signals. Furthermore, the circuit is not constructed such that some of input time-slot signals which are not actually output are prevented from being stored.

SUMMARY OF THE INVENTION

The present invention was created in view of the above circumstances, and an object thereof is to provide a time switch control system which permits desired channel settings and reduction in power consumption.

To achieve the above object, the present invention provides, as shown in FIG. 2, a time switch control system having a cross-connect function, which comprises input signal retaining means 1 for retaining predetermined ones of a plurality of time-slot signals input thereto, identifying means 2 for identifying time-slot signals which are specified by channel setting information to be output, as time-slot signals to be retained by the input signal retaining means 1, and outputting identification information, retention control means 3 for storing the identification information from the identifying means 2 and controlling the input signal retaining means 1 in accordance with the stored identification information such that only the specified time-slot signals are retained by the input signal retaining means 1, and exchange/output means 4 for exchanging the time-slot signals retained by the input signal retaining means 1 in accordance with the channel setting information, and outputting the exchanged signals.

With the arrangement described above, the identifying means 2 identifies time-slot signals which are specified by channel setting information to be output, as time-slot signals to be retained by the input signal retaining means 1, and outputs identification information to the retention control means 3. The retention control means 3 stores the identification information from the identifying means 2, then reads out the stored identification information, and controls the input signal retaining means 1 in accordance with the contents of the identification information. Namely, only the specified time-slot signals are retained by the input signal retaining means 1. The exchange/output means 4 exchanges the time-slot signals stored in the input signal retaining means 1 in accordance with the channel setting information, and outputs the exchanged signals.

Accordingly, not only the channel setting can be made as desired, but also the power consumption is reduced because the input signal retaining means 1 does not store unnecessary time-slot signals.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4(A) is a diagram showing successions of time-slot signals input to the time switch control device;

FIG.4(B) is a diagram showing channel settings in the time switch control device;

FIG. 4(C) is a diagram showing enable signals;

FIG. 5(A) is a diagram showing input time-slot signals retained by a data memory;

FIG. 5(B) is a diagram showing successions of time-slot signals output from the time switch control device;

FIG. 8(A) is a diagram illustrating a time-based transition of input signals in another alternative embodiment;

FIG. 8(B) is a block diagram showing the arrangement of the embodiment as in FIG. 8(A)

DESCRIPTION OF THE PREFERRED EMBODIMENTS

Embodiments of the present invention will be hereinafter described with reference to the drawings.

Figures 1A, 1B, 1C:
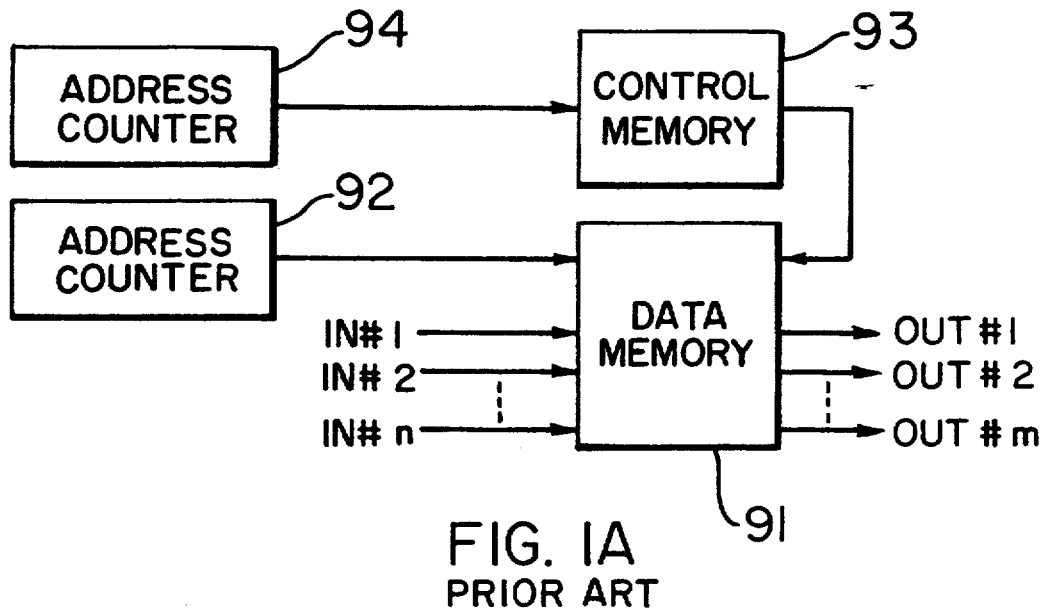
FIG.1(A) is a block diagram showing the arrangement of a conventional time switch.
FIG. 1(B) is a diagram showing input signals to the time switch.
FIG. 1(C) is a diagram showing output signals from the time switch.
Figure 2:
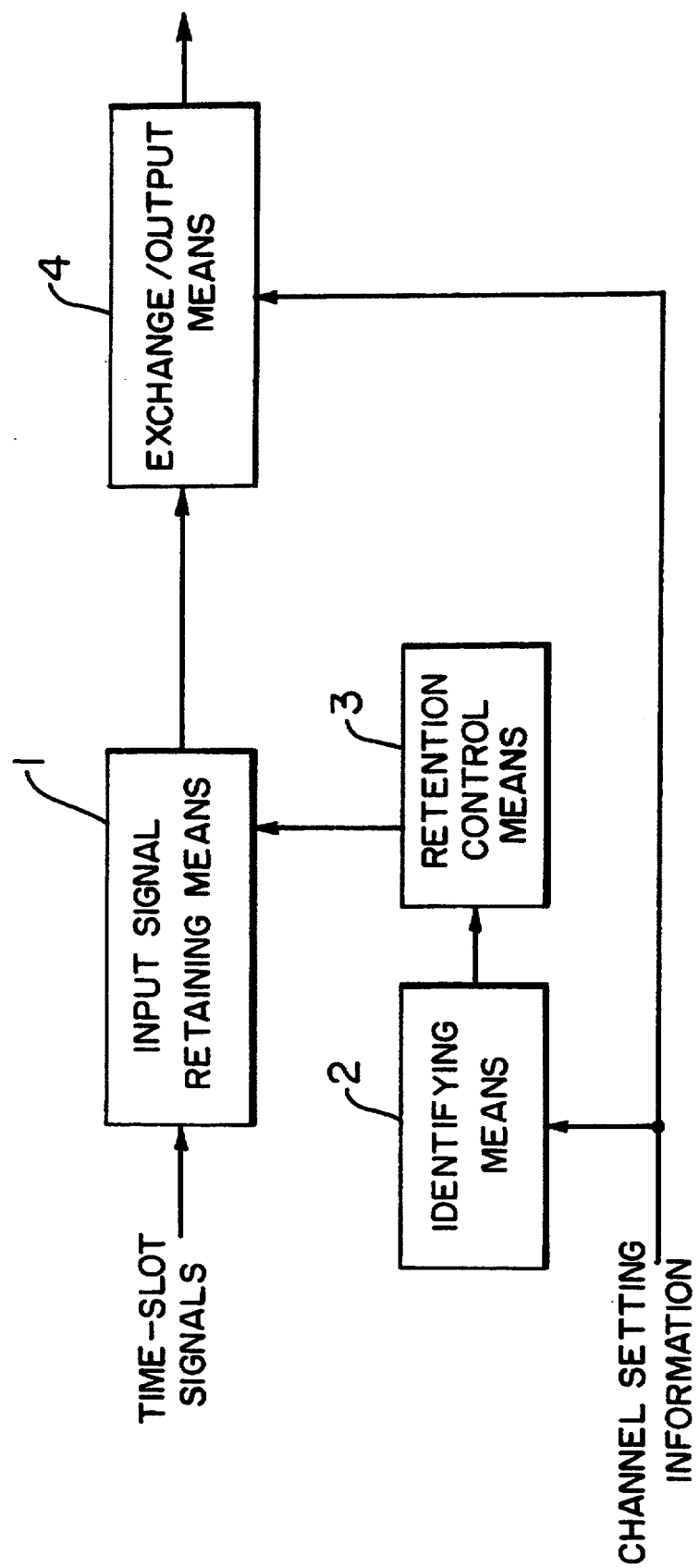
FIG. 2 is a diagram illustrating the principles of the present invention.
Figure 3:
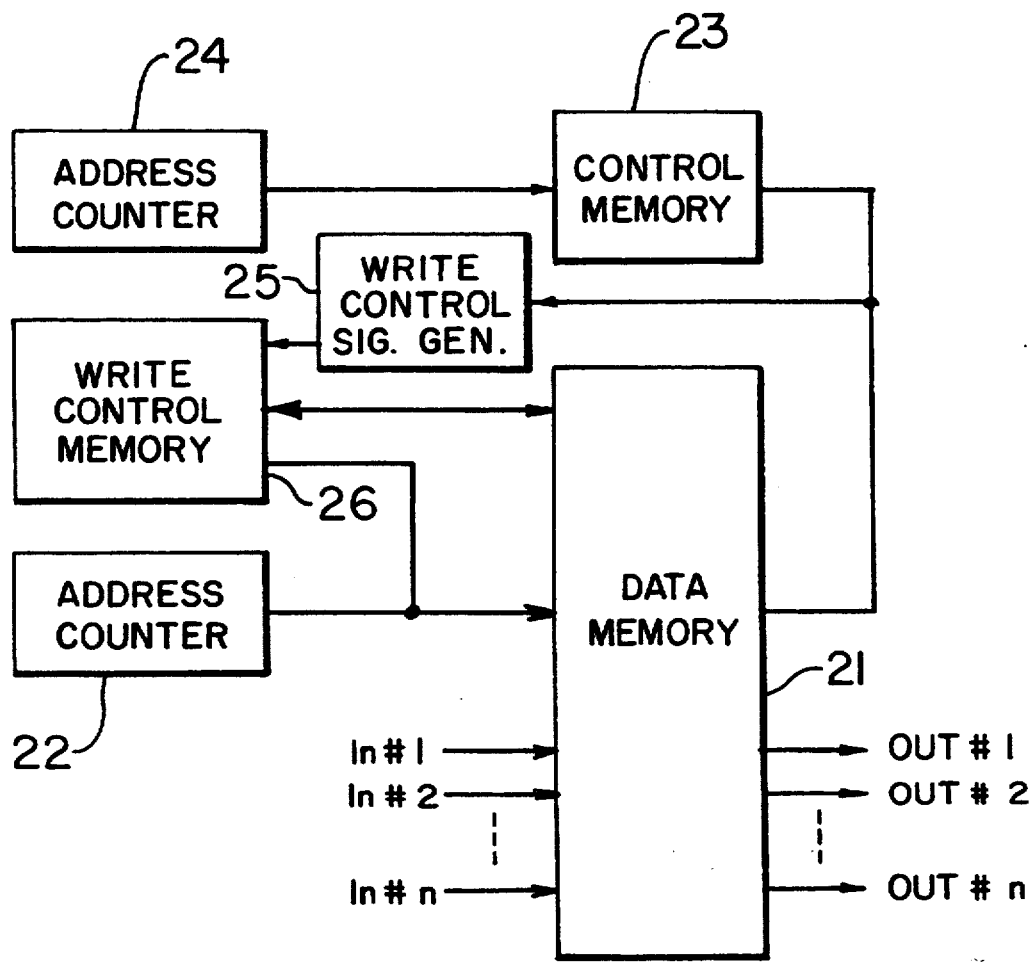
FIG. 3 is a diagram showing the basic arrangement of a time switch control device.

FIG. 3 illustrates the basic arrangement of a time switch control device according to the present invention. The basic arrangement of the time switch control device shown in FIG. 3 will be described referring also to FIGS. 4 and 5, which illustrate time-slot signals at different parts in the control device, channel settings, enable signals, etc.

A data memory (DM) 21 is supplied with input signals In#1 to In#n from n channels. The input signals In#1 to In#n are each composed of four time-slot signals per cycle, arranged in order of a1 to a4, as shown in FIG. 4(A). The data memory (DM) 21 is connected to a DMAD address counter (DMAD CNTR) 22 which outputs addresses a1 to a4 corresponding to the order a1 to a4 in which they are mentioned.

A control memory (CM) 23 stores channel setting information. The channel setting information is given as a command from the operating system of a work station or the like, and comprises address information in accordance with which input time-slot signals are to be exchanged.

FIG. 4(B) illustrates an example of channel setting stored in the control memory (CM) 23. In the figure, time-slot signals of the input signals In#1 to In#n, which are to be exchanged, are indicated by their input orders a1 to a4 at address locations b1 to b4 of output signals Out#1 to Out#m. The addresses b1 to b4 correspond to output orders of time-slot signals, respectively. Namely, "#1,a3" in the upper left corner in the figure, for example, indicates that the time-slot signal 13 with input order a3 in the input signal In#1 (see FIG. 4(A)) is output as the time-slot signal with output order b1 of the output signal Out#1. Similarly, "#2,a3" in the third column from the left in the uppermost row indicates that the time-slot signal 23 with input order a3 in the input signal In#2 (see FIG. 4(A)) is output as the time-slot signal with output order b3 of the output signal Out#1. In the figure, symbol "—" indicates that the channel concerned is not set and thus no time-slot signal is to be output.

Referring again to FIG. 3, the control memory (CM) 23 is connected to a CMAD address counter (CMAD CNTR) 24 which outputs the addresses b1 to b4 in the order mentioned. The control memory (CM) 23 outputs channel setting information, which has been written in storage locations thereof specified by the addresses output from the CMAD counter (CMAD CNTR) 24, to the data memory (DM) 21.

In accordance with the input channel setting information, the data memory (DM) 21 reads out the input time-slot signals stored in the manner described later, and outputs the read signals as the output signals Out#1 to Out#m to m channels. FIG. 5(B) illustrates these output signals Out#1 to Out#m. By reading the input time-slot signals in accordance with the channel setting information, the time-slot signals are exchanged at the same time.

Referring to FIG. 3, the channel setting information in the control memory (CM) 23 is also supplied to write enable signal generating means 25. The arrangement of the write enable signal generating means 25 will be described in detail later with reference to FIGS. 6 to 9. In brief, based on the channel setting information, the write enable signal generating means 25 discriminates between time-slot signals to be output as the time-slot signals of the output signals Out#1 to Out#m and those which are not actually output, among the input time-slot signals, and outputs write enable signals to a DM write control memory (DMC) 26.

FIG. 4(C) illustrates write enable signals which are stored in the DM write control memory (DMC) 26 after being generated by the write enable signal generating means 25. Specifically, in the illustrated example, the write enable signal generating means 25 determines based on the channel setting information shown in FIG. 4(B) that the input time-slot signals 12, 21, 24, n3 and n4 are not actually output and that the remaining input time-slot signals 11, 13, 14, 22, 23, n1 and n2 are to be output. The write enable signal generating means 25 then outputs, as a write enable signal, a signal "1" to the DM write control memory (DMC) 26 at each of the address locations corresponding to the time-slot signals which are not output, and a signal "0" to the same memory 26 at each of the address locations corresponding to the time-slot signals which are to be output, as shown in FIG. 4(C).

Referring again to FIG. 3, the DMAD counter (DMAD CNTR) 22 connected to the DM write control memory (DMC) 26 sequentially outputs the addresses a1 to a4 to the data memory (DM) 21 and the DM write control memory (DMC) 26. Thus, in accordance with the input order of the addresses, the DM write control memory (DMC) 26 outputs write enable signals corresponding to the addresses, and the data memory (DM) 21 stores only those time-slot signals with respect to which the write enable signal "0" has been set, among the input signals In#1 to In#n corresponding to the addresses. Namely, when the address a1, for example, is output from the DMAD counter (DMAD CNTR) 22, the DM write control memory (DMC) 26 outputs write enable signals "01 . . . 0", and thus the data memory (DM) 21 stores therein the time-slot signals with order a1, i.e., the time-slot signal 11 of the input signal In#1 to the time-slot signal n1 of the input signal In#n.

Similarly, when the address a2 is output from the DMAD counter (DMAD CNTR) 22, the DM write control memory (DMC) 26 outputs write enable signals "10 . . . 0", and the data memory (DM) 21 stores therein the time-slot signals with order a2, i.e., the time-slot signal 22 of the input signal In#2 to the time-slot signal n2 of the input signal In#n. When the address a3 is output from the DMAD counter (DMAD CNTR) 22, the DM write control memory (DMC) 26 outputs write enable signals "00 . . . 1", and the data memory (DM) 21 stores therein the time-slot signals with order a3, i.e., the time-slot signal 13 of the input signal In#1, the time-slot signal 23 of the input signal In#2, etc. Further, when the address a4 is output from the DMAD counter (DMAD CNTR) 22, the DM write control memory (DMC) 26 outputs write enable signals "01 . . . 1", and the data memory (DM) 21 stores therein the time-slot signals with order a4, i.e., the time-slot signal 14 of the input signal In#1 etc.

As a result, the time-slot signals are stored in the data memory (DM) 21 as shown in FIG. 5(A). As seen from the figure, the data memory (DM) 21 stores only those time-slot signals which are to be output. Thus, since the data memory (DM) 21 stores only the required data, power consumed by the data memory (DM) 21 can be reduced. The embodiment described above is a sequential write/random read type, and thus desired channel settings can be made.

As already mentioned, the data memory (DM) 21 reads out the input time-slot signals (FIG. 5(A)) stored therein in accordance with the channel setting information (FIG. 4(B)) supplied thereto from the control memory (CM) 23, and outputs the read signals as the output signals Out#1 to Out#m (FIG. 5(B)) to m channels.

The arrangement of the write enable signal generating means 25 in the time switch control device of FIG. 3 will be now described with reference to FIGS. 6 to 9 illustrating four embodiments, respectively. The four embodiments differ from each other in the form of input signals and the arrangement of the DM write control memory (DMC).

Figure 6A:
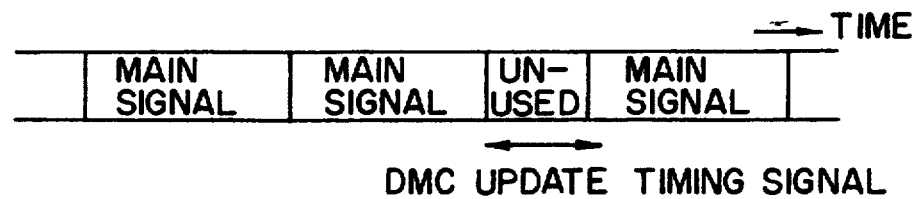
FIG. 6(A) is a diagram illustrating a time-based transition of input signals in a first embodiment.
Figure 6B:
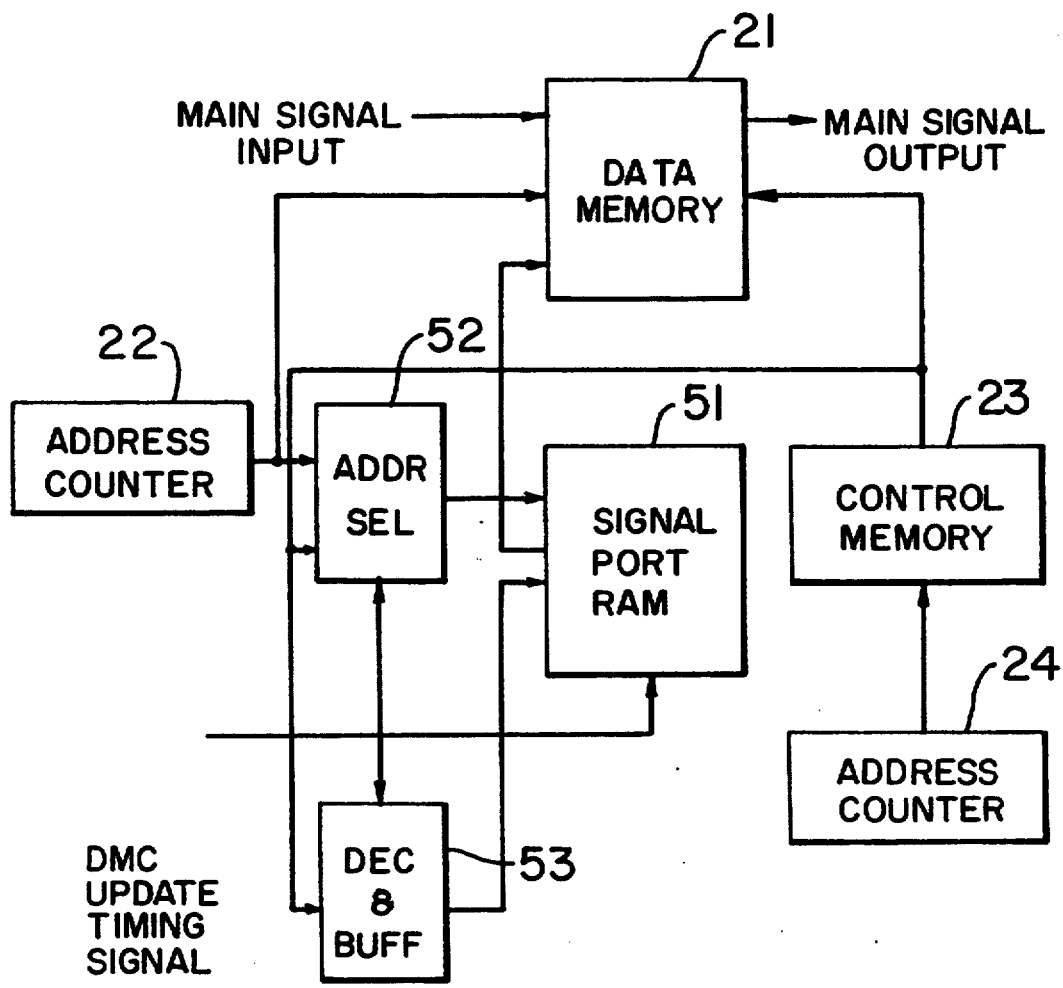
FIG. 6(B) is a block diagram showing the arrangement of the first embodiment.

FIG. 6 illustrates a first embodiment, wherein (A) shows a time-based transition of input signal and (B) shows the arrangement of the first embodiment. In the case where the input signal includes an unused interval besides main signals on a time base as shown in FIG. 6(A), the first embodiment shown in FIG. 6(B) is applied wherein the DM write control memory (DMC) 51 is updated in the unused interval. In FIG. 6(B), like reference numerals are used to represent like elements appearing in FIG. 3, and a description of such elements is omitted.

A DM write control memory (DMC) 51 shown in FIG. 6(B) comprises a single port RAM. The channel setting information output from the control memory (CM) 23 is supplied to the DM write control memory (DMC) 51 separately through an address selector (ADDR SEL) 52 and a decoder/buffer (DEC & BUFF) 53. The output of the DMAD counter (DMAD CNTR) 22 is supplied to the DM write control memory (DMC) 51 via the address selector (ADDR SEL) 52. The address selector (ADDR SEL) 52, the decoder/buffer (DEC & BUFF) 53, and the DM write control memory (DMC) 51 are each supplied with a DMC update timing signal. The DMC update timing signal is output in an unused interval, i.e., during a period in which no main signal (time-slot signal) is input, as shown in FIG. 6(A), and is generated by a timing generator circuit (not shown) based on a synchronizing signal extracted from the input main signal.

The address selector (ADDR SEL) 52 has a switching function, and when no DMC update timing signal is supplied thereto (in the main signal interval), it allows the address output from the DMAD counter (DMAD CNTR) 22 to pass therethrough to the DM write control memory (DMC) 51. When supplied with the DMC update timing signal (in the unused interval), the address selector (ADDR SEL) 52 allows address information in the channel setting information, input from the control memory (CM) 23, to be supplied to the DM write control memory (DMC) 51.

The decoder/buffer (DEC & BUFF) 53 remains inoperative when no DMC update timing signal is supplied thereto (in the main signal interval). When the DMC update timing signal is supplied (in the unused interval), the decoder/buffer (DEC & BUFF) 53 generates write enable signals based on the channel setting information, and outputs the write enable signals to the DM write control memory (DMC) 51.

The DM write control memory (DMC) 51 is set in data read mode when no DMC update timing signal is supplied thereto (in the main signal interval), and outputs write enable signals already stored therein to the data memory (DM) 21 in accordance with the addresses supplied thereto from the DMAD counter (DMAD CNTR) 22 through the address selector (ADDR SEL) 52. In accordance with the write enable signals, the data memory (DM) 21 reads the input time-slot signals. On the other hand, when the DMC update timing signal is supplied (in the unused interval), the DM write control memory (DMC) 51 is set in update write mode and updates the write enable signals stored therein in accordance with the outputs from the address selector (ADDR SEL) 52 and the decoder/buffer (DEC & BUFF) 53.

Figure 7A:
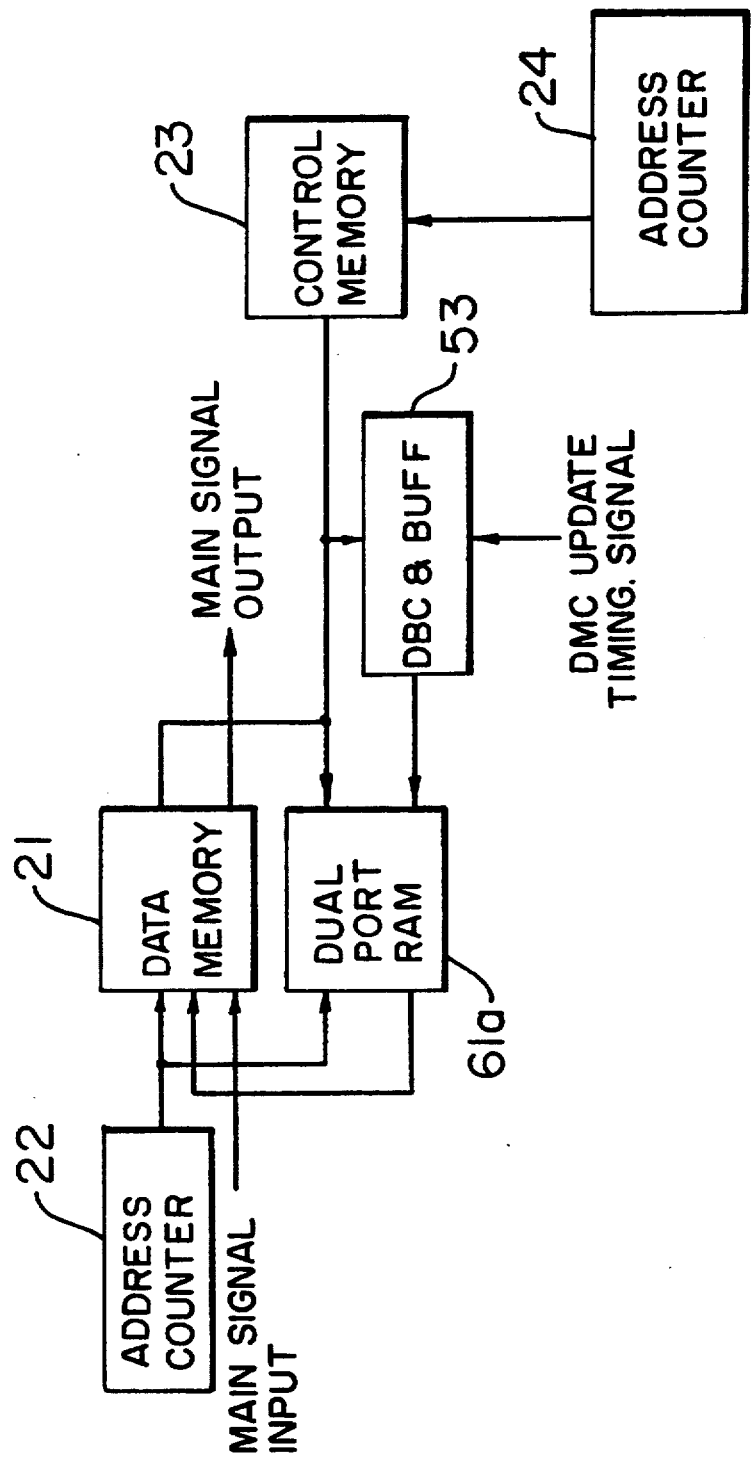
FIGS. 7A and B are block diagrams showing alternative embodiments in accordance with the invention.
Figure 7B:
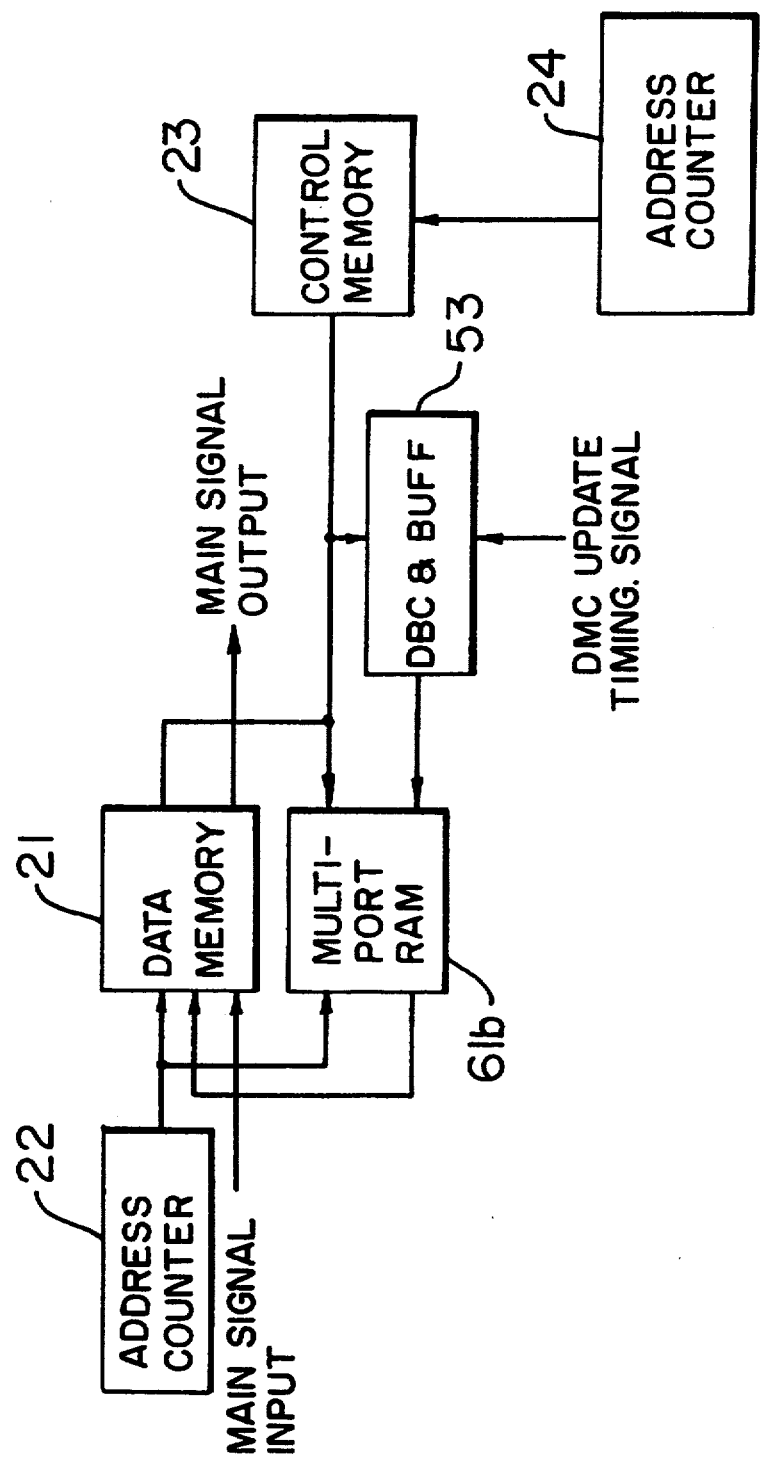

FIGS. 7A,B illustrate another embodiment, and also in this embodiment, the DM write control memory (DMC) 61a is updated in an unused interval of the input signal. In the figure, like reference numerals are used to denote like elements appearing in FIG. 6B, and a description thereof is omitted.

In the embodiment (FIG. 7A), a DM write control memory (DMC) 61a comprises a dual port RAM, and thus an address selector (ADDR SEL) used in the first embodiment can be omitted. Alternatively, a multiport RAM (FIG. 7B) may be used for the DM write control memory (DMC) 61b.

FIGS. 8A,B illustrate another embodiment, wherein (A) shows a time-based transition of input signal, and (B) shows the arrangement of the embodiment. In the case where the input signal is composed of main signals alone and includes no unused interval on the time base, as shown in FIG. 8(A), the embodiment shown in FIG. 8(B) is applied in which the DM write control memory (DMC) is updated in every other main signal interval. The arrangement of the embodiment is partly similar to that of the first embodiment; therefore, like reference numerals are used to represent like elements shown in FIG. 6B and a description of such elements is omitted.

As illustrated, the DM write control memory (DMC) is composed of parallel-connected DMC#A 71 and DMC#B 72 each comprising a single port RAM. The outputs of the DMC#A 71 and DMC#B 72 are supplied to the data memory (DM) 21 via a DMC selector (DMC SEL) 73. A DMC switching signal is generated which alternately turns ON and OFF each time a new main signal appears, and is supplied to the address selector (ADDR SEL) 52, the decoder/buffer (DEC & BUFF) 53, DMC#A 71, DMC#B 72, and the DMC selector (DMC SEL) 73. The DMC switching signal is generated by a timing generator circuit (not shown) based on a synchronizing signal extracted from an input main signal.

When the DMC switching signal is ON (high-level signal), the address selector (ADDR SEL) 52 outputs addresses supplied thereto from the DMAD counter (DMAD CNTR) 22 to the DMC#A 71, and also outputs address information in the channel setting information supplied thereto from the control memory (CM) 23 to the DMC#B 72. The decoder/buffer (DEC & BUFF) 53, when the DMC switching signal is ON, supplies no signal to the DMC#A 71 and outputs write enable signals obtained based on the channel setting information to the DMC#B 72. Further, when the DMC switching signal is ON, the DMC#A 71 is set in data read mode whereas the DMC#B 72 is set in update write mode. The DMC selector (DMC SEL) 73, when the DMC switching signal is ON, supplies the output of the DMC#A 71 to the data memory (DM) 21.

On the other hand, when the DMC switching signal is OFF (low-level signal), the individual elements operate in the same manner as described above except that the DMC#A 71 should be read as DMC#B 72 and vice versa.

Consequently, while the DMC switching signal is ON (high-level signal), the DMC#A 71 is set in data read mode and outputs the write enable signals already stored therein to the data memory (DM) 21, whereas the DMC#B 72 updates the write enable signals. On the other hand, while the DMC switching signal is OFF (low-level signal), the DMC#B 72 is set in data read mode and controls the write operation of signals input to the data memory (DM) 21, and the DMC#A 71 updates the write enable signals. Thus, even in the case where the input signal is composed of main signals alone and includes no unused interval on the time base, the write enable signals in the DMC#A 71 and DMC#B 72 can be updated.

Figure 9A:
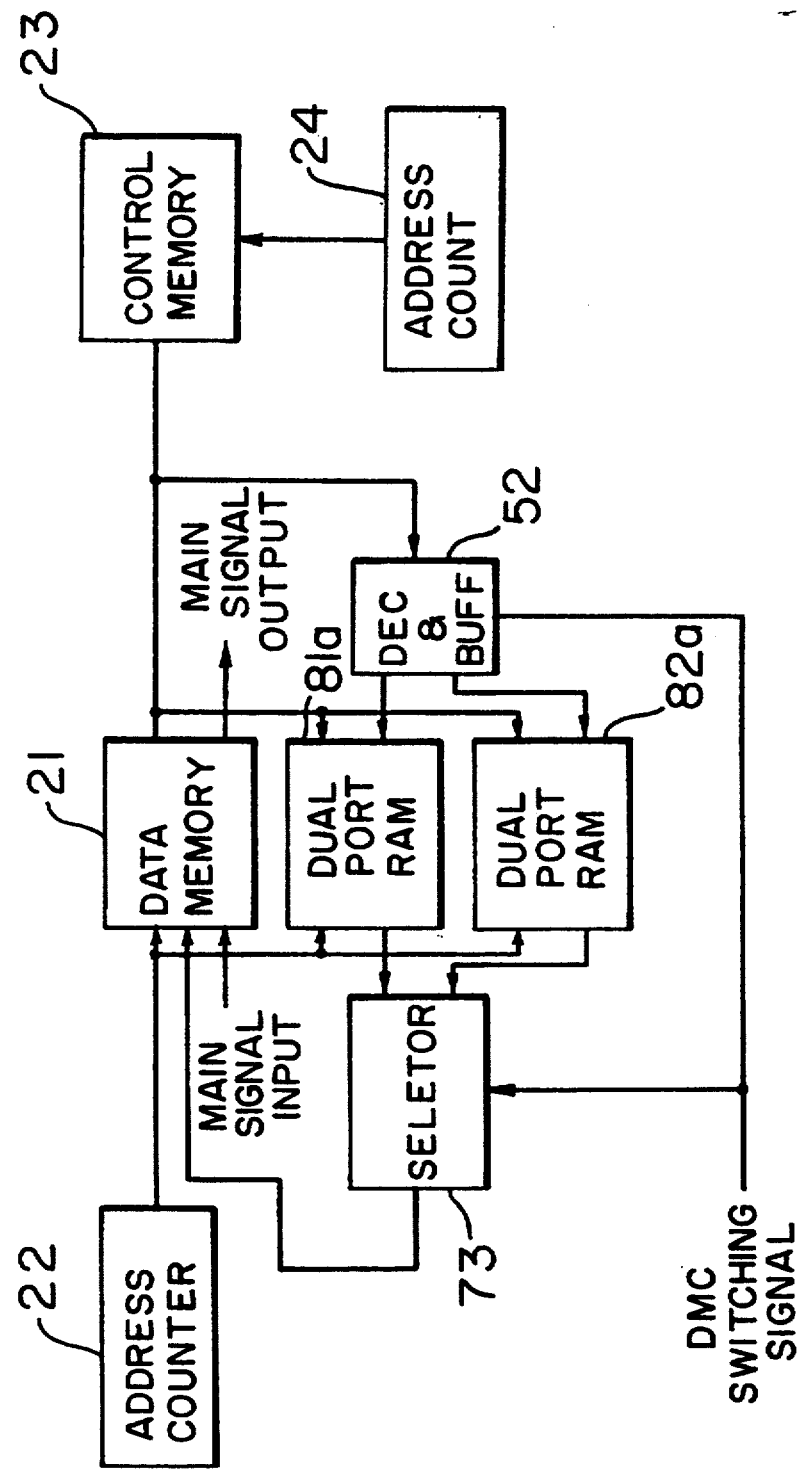
FIGS. 9A–C are block diagrams showing additional embodiments.
Figure 9B:
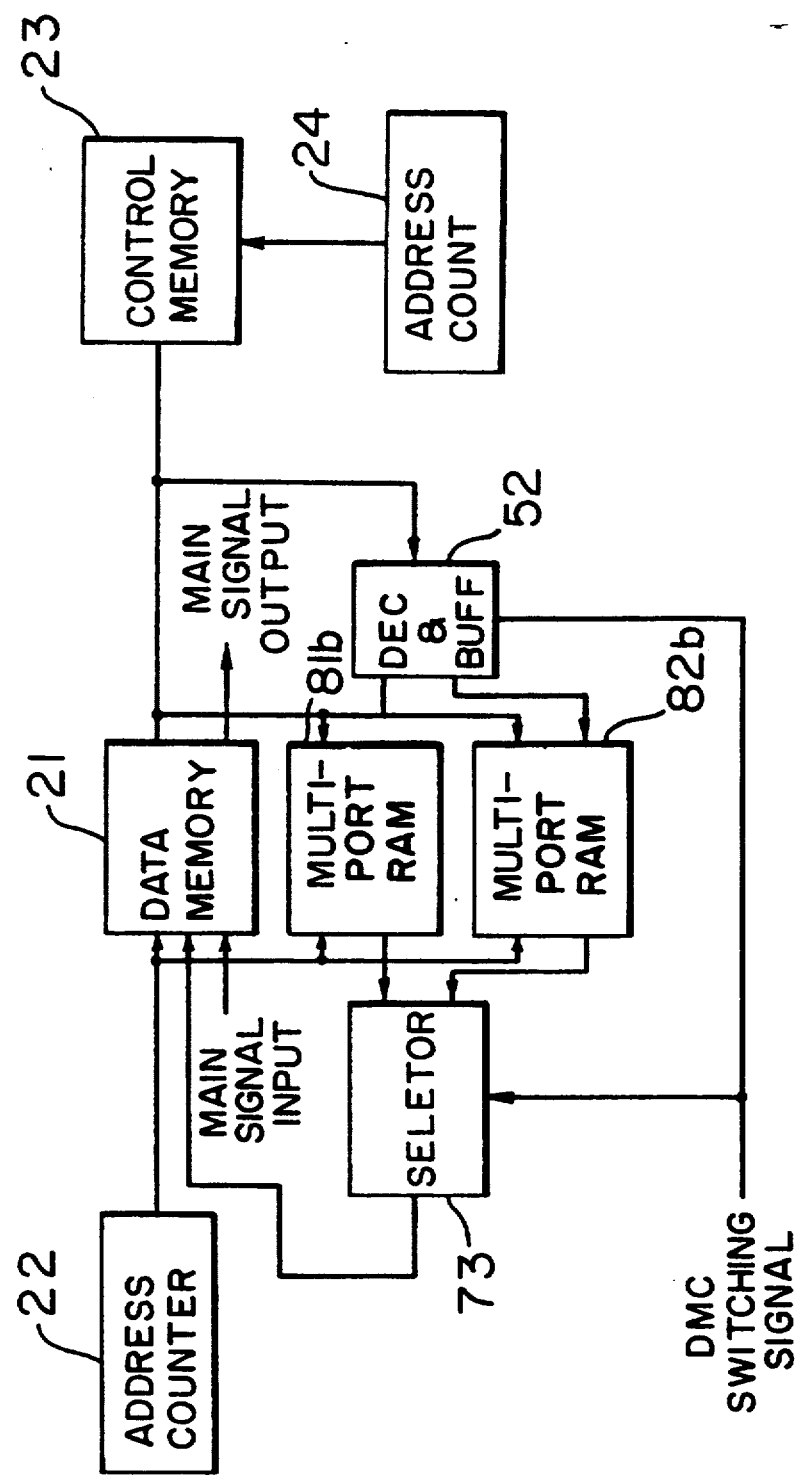
Figure 9C:
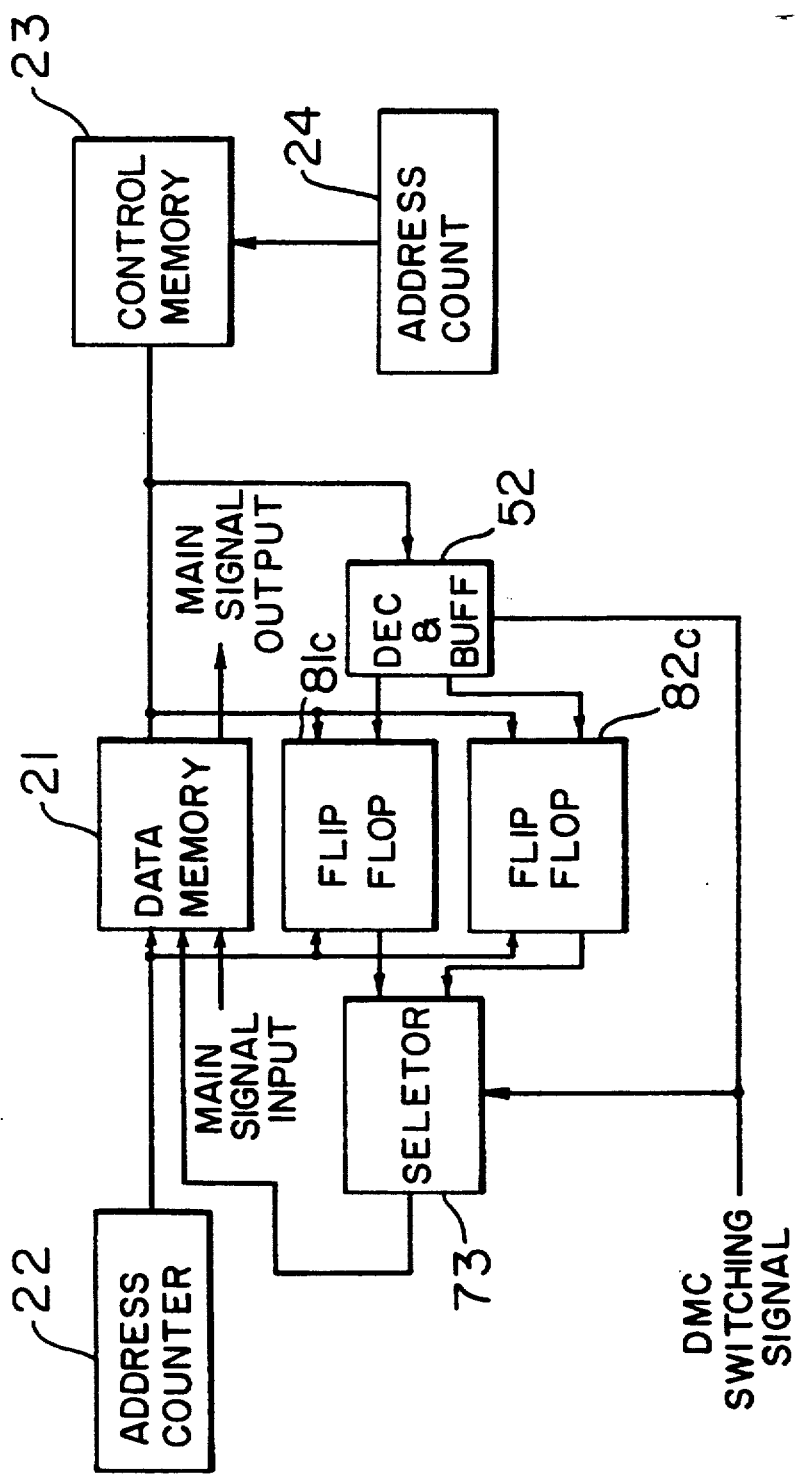

FIGS. 9A-C illustrate other embodiments, and also in these embodiments, the DM write control memory (DMC) is updated in response to an input signal which is composed of main signals alone and includes no unused interval on the time base. The arrangement of the fourth embodiment is partly similar to that of the embodiment shown in FIG. 8B; therefore, like reference numerals are used to represent like elements shown in FIG. 8B and a description thereof is omitted.

In the embodiment of FIG. 9A DMC#A 81a and DMC#B 82a each comprise a dual port RAM, and accordingly, an address selector (ADDR SEL) used in the third embodiment can be omitted. Alternatively, a multiport RAM (FIG. 9B) may be used for each of the DMC#A 81b and DMC#B 82b.

Although in the foregoing embodiments, a RAM is used for the DM write control memory (DMC), flip-flops 81C, 82C may alternatively be used therefor (FIG. 9C).

As described above, according to the present invention, time-slot signals to be stored in the data memory (DM) are identified based on the channel setting information, and the data memory (DM) is controlled based on the identification data in such a manner that it stores only the time-slot signals that should be retained thereby. Accordingly, not only the channel setting can be made as desired, but also the power consumption is reduced because the data memory (DM) does not store unnecessary time-slot signals.

Usually, signals handled by the data memory (DM) have a 4-bit configuration, the number (n) of the channels for the input signals In#1 to In#n is 16, and the number (m) of the channels for the output signals Out#1 to Out#m is 2. In this case, power consumed by the data memory (DM) can be reduced to $\frac{1}{8}$. Since, however, the DM write control memory (DMC) consumes about $\frac{1}{4}$ of the power consumed by the data memory (DM), reduction of the power consumption by the entire system is about $\frac{3}{8}$, thus permitting a drastic reduction in power consumption of approximately 60%. Thus, the consumption of electric power by the entire transmission system can be reduced, e.g., from 120 W to 50 W.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A time switch control system having a cross-connect function, comprising:

input signal retaining means for retaining predetermined ones of a plurality of time-slot signals input thereto;

identifying means for identifying and predetermined time-slot signals, which are specified by channel setting information to be output as time-slot signals, to be retained by said input signal retaining means, and said identifying means outputting identification information only of said specified time slot signals;

retention control means for storing therein the identification information from said identifying means, and controlling said input signal retaining means in accordance with the stored identification information such that only the specified time-slot signals are retained by said input signal retaining means; and exchange/output means for exchanging the time-slot signals retained by said input signal retaining means in accordance with the channel setting information, and out-putting the exchanged signals.

2. The time switch control system according to claim 1, wherein said retention control means stores therein the identification information from said identifying means during a period in which no time-slot signal is input to said input signal retaining means, and controls said input signal retaining means in accordance with the identification information stored therein during a period in which time-slot signals are supplied to said input signal retaining means.

3. The time switch control system according to claim 1, wherein said retention control means comprises first and second retention control means connected in parallel with each other, said first and second retention control means being switched each time time-slot signals corresponding to one cycle are input to said input signal retaining means such that, while said first retention control means stores therein the identification information from said identifying means, said second retention control means reads out the identification information stored therein and controls said input signal retaining means, and that, while said second retention control means stores therein the identification information from said identifying means, said first retention control means reads out the identification information stored therein and controls said input signal retaining means.

4. The time switch control system according to claim 1, wherein said retention control means includes a single port RAM, the identification information from said identifying means being stored in the single port RAM.

5. The time switch control system according to claim 1, wherein said retention control means includes a multiport RAM, the identification information from said identifying means being stored in the multiport RAM.

6. The time switch control system according to claim 1, wherein said retention control means includes a flip-flop, the identification information from said identifying means being stored in the flip-flop.

* * * * *

UNITED STATES PATENT AND TRADEMARK OFFICE
CERTIFICATE OF CORRECTION

PATENT NO. : 5,430,723
DATED : July 4, 1995
INVENTOR(S) : Hiroshi Nakaide, et. al.

It is certified that error appears in the above-indentified patent and that said Letters Patent is hereby corrected as shown below:

Title page, item [73], Assignee:  should read-- Fujitsu Limited--.

Signed and Sealed this

Seventh Day of May, 1996

Attest:

BRUCE LEHMAN

*Attesting Officer*            *Commissioner of Patents and Trademarks*